June 24, 1952  E. G. BEARD  2,601,427
WAVE LENGTH MODULATOR
Filed Jan. 26, 1949  2 SHEETS—SHEET 1

INVENTOR.
ERNEST GORDON BEARD.
BY
AGENT.

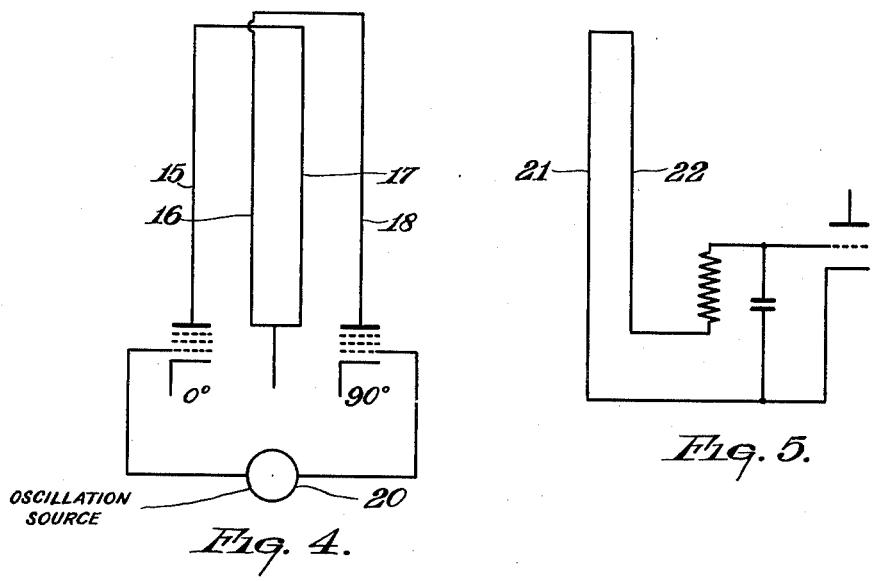
Fig. 4.
Fig. 5.
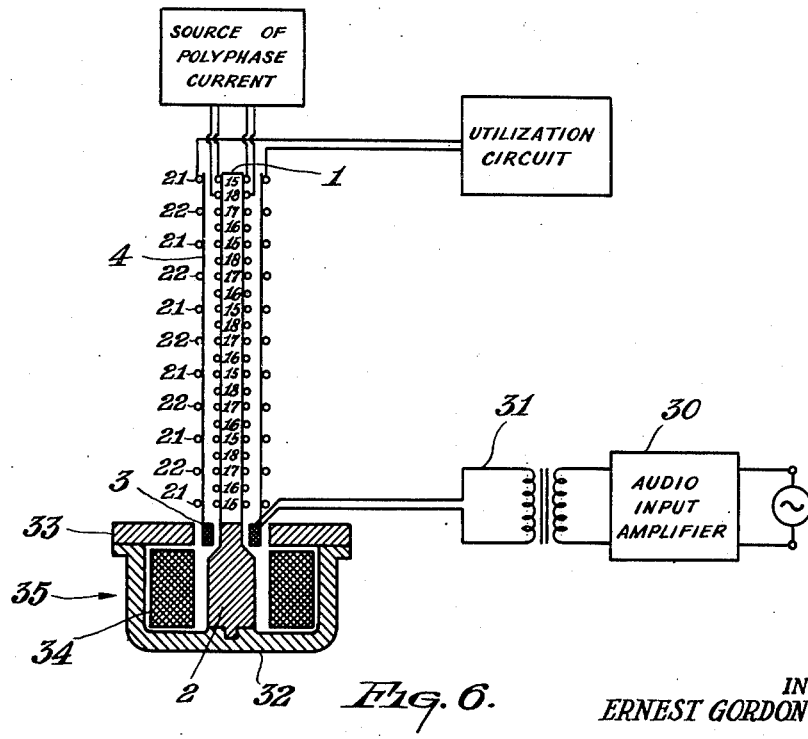
Fig. 6.
INVENTOR.
ERNEST GORDON BEARD.
BY Fred M. Vogel
AGENT Patented June 24, 1952

2,601,427

UNITED STATES PATENT OFFICE 2,601,427

WAVE LENGTH MODULATOR

Ernest Gordon Beard, Willoughby, New South Wales, Australia, assignor to Hartford National Bank and Trust Company of Hartford, Conn., as trustee Application January 26, 1949, Serial No. 72,888
In Australia February 5, 1948

4 Claims. (Cl. 332—29)

The present invention relates to phase modulators and is particularly directed to an electro-mechanical phase modulator which is adapted for use in frequency modulating a carrier wave with intelligence.

The principal object of the invention is to provide apparatus for wavelength modulating an electrical wave in accordance with variations in intensity of a modulating intelligence.

Another object of the invention is to provide an efficient transducer for wavelength modulation of a carrier signal.

Further objects of the invention will appear from the following description.

Figure 1:
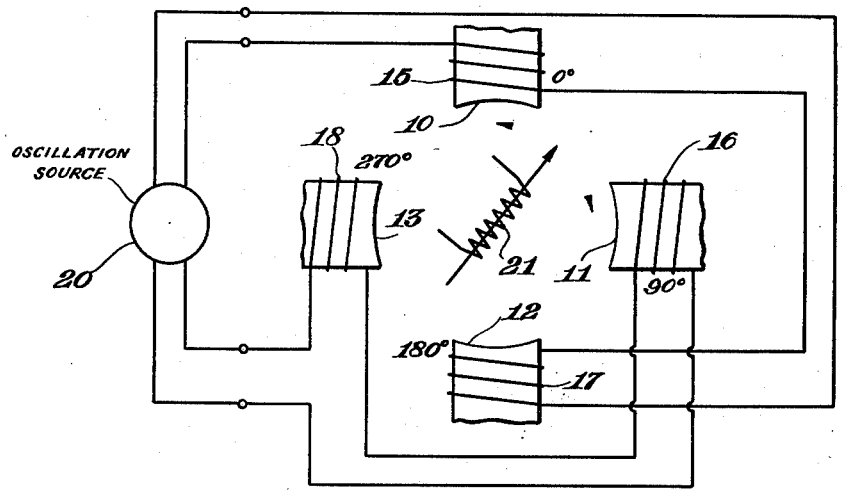
Figure 2:
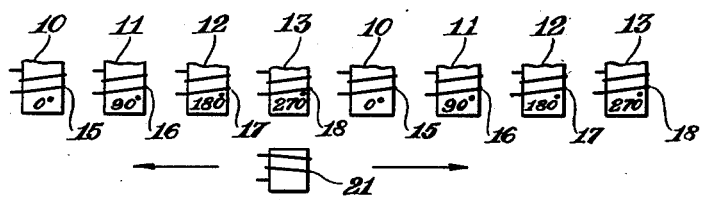
Figure 3:
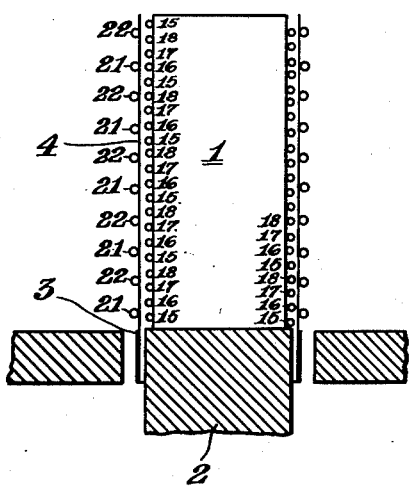

The invention will be described with the aid of the drawing accompanying the specification in which Figures 1 and 2 diagrammatically illustrate the principles underlying the invention, Figures 3, 4 and 5 diagrammatically illustrate one specific embodiment of the invention, and Figure 6 shows in greater detail the embodiment of the invention illustrated in Figure 3.

If a rotating magnetic field is produced by means of a two phase current applied in quadrature to a multipole stator as shown in Figure 1 and a coil 1 is placed in the field, an electromotive force of the same frequency as the current will be induced in the coil. The phase of this electromotive force may be changed without any change in its amplitude by moving the coil in an angular manner to a different position.

It therefore follows that, if the coil is caused to be rotated by a modulating signal, the phase change produced would be the product of 360 degrees and the number of revolutions of the coil. Thus phase changes of many cycles could be produced without any amplitude modulation.

If the poles are arranged in line and repeated as shown in Figure 2 the same result can be obtained by moving the coil along the line of poles.

One application of the principles illustrated in Figures 1 and 2 to the modulation of a carrier wave is shown in Figure 3. In Figure 3 a former 1 is secured to the centre pole piece 2 of a device for translating audio frequency currents into mechanical vibrations such as the motor of a moving coil loud speaker. Wound on the former 1 is a coil composed of four wires which are connected as shown in Figure 4. The coil is adapted to be supplied with two phase current of the same frequency as that of the carrier wave. Attached to the moving coil 3 of the loudspeaker motor is a second former 4 upon which is wound a coil composed of two wires which are connected in series with a tuned circuit as shown in Figure 5. If the coil on the second former 4 is wound with the same gauge of wire as the coil on the former 1 the turns of the coil on the second former are preferably spaced apart a distance equal to the thickness of the wire. The tuned circuit may be arranged to feed voltage amplifiers of frequency multipliers.

The coil on the former 1 constitutes the stator and when two phase current of a frequency equal to that of the desired carrier frequency is applied thereto a magnetic field will travel axially along the coil. The coil on the former 4 is the equivalent of the coil shown in Figure 2 and therefore an electromotive force of the same frequency as that of the carrier frequency will be induced therein. When the coil on the former 4 is driven axially by the voice coil of the loudspeaker motor the phase of the induced voltage will be changed 360 degrees if the coil on the former 4 is moved through a distance equal to the space occupied by four adjacent wires of the coil on the former 1. Thus the voltages induced in the coil on the former 4 will be phase modulated.

Fig. 6 shows a more detailed representation of the arrangement of Fig. 3. In Figure 6 are shown moving voice coil 3, pole piece 2, formers 1 and 4, and coils 15—22. An audio signal amplified by an amplifier 30 is applied to the voice coil 3 through a transformer 31. Also shown in Fig. 6 are a coil case 32, a top plate 33 and a field coil 34 of speaker assembly 35.

In order to convert phase modulation into frequency modulation in a device such as above described the movement of the voice coil may be arranged to vary inversely with the frequency. This naturally follows if the mass of the moving parts such as the moving coil 3 and the coil on the former 4 is sufficiently great to give them a resonance point at a frequency below the lowest frequency to be transmitted.

The extent of the frequency modulation produced as above indicated can be derived approximately in a very simple manner.

A phase shift of 90 degrees at a specified modulating frequency will produce a frequency deviation equal to the modulating frequency and, as the phase shift varies inversely as the frequency, the frequency deviation is equal to that of the lowest modulating frequency at all of the higher frequencies.

Movement of the coil on the former 4 through a distance equal to that occupied by one wire of the coil on the former 1 produces a phase shift of 90 degrees.

Assuming, for example, a maximum movement of the voice coil of 0.1 inch at the lowest modulating frequency and the use of wire of say 40 gauge (0.0035 inch) the deviation is 0.1/0.0035×lowest frequency
28.5×lowest frequency For broadcasting (the lowest frequency being 30 cycles per second) this gives a deviation of 855 cycles per second, and for communication (the lowest frequency being 300 cycles per second) a deviation of 8550 cycles. The movement of the voice frequency divided by the ratio of the highest frequency to the lowest frequency. For example, for broadcasting if the movement at 30 cycles per second is 0.1 inch at 10,000 cycles per second it will be only 0.0003 inch.

This deviation can be still further increased by reducing the size of the wire or increasing the extent of the movement.

A complete modulator according to the invention is a 6 terminal device to which are applied the modulating frequency and the carrier frequency. The output of the modulator is frequency modulated. The modulator may be used at almost any frequency without modification as all of the tuned circuits are external to the modulator. The modulator may be inserted between any two stages of a continuous wave or amplitude modulation transmitter and will frequency modulate the output.

The foregoing arrangement may be used to produce sine and/or cosine functions of the modulating frequency in the following manner:

A carrier wave is applied to the coil on the former 4. This will cause electromotive forces of the frequency of the carrier wave to be induced in the coil on the former 1. The electromotive forces induced in one pair of the wires constituting the coil on the former 1 will be amplitude modulated by the approximate sine function of the modulating frequency whilst the electromotive forces induced in the other pair of the wire constituting the coil on the former 1 will be amplitude modulated by the approximate cosine function of the modulating frequency. The functions may be abstracted by demodulation.

In practice it will be necessary to ensure that no electromotive forces are induced in the circuits connected to the coil on the former 4 from the circuits connected to the other coil. This may be done by neutralizing the auxiliary couplings between the circuits.

It is to be understood that various alterations, modifications and/or additions may be incorporated in the foregoing without departing from the spirit and scope of the invention as defined by the appended claims.

Having now described my invention what I claim as new and desire to secure by Letters Patent is:

1. A transducer for intelligence and an electrical wave having wavelength modulation proportional to variations in the intensity of said intelligence, comprising a first coil member having a plurality of coaxial coil elements axially arranged in spaced apart relationship and each defining a phase winding, a second coil member concentrically disposed about said first coil member and magnetically coupled to said coil elements and movable relative thereto, a source of polyphase current having a frequency value equal to the frequency value of said electrical wave, means to apply a respective phase of said polyphase current to each of said coaxial coil elements, means to produce relative motion between said first and second coil members in a direction parallel to the axis of said coil elements and in an amount proportional to intensity variations of said intelligence, and an output coupled to said second coil member.

2. A transducer for an intelligence signal and an electrical wave having wavelength modulation proportional to variations in the intensity of said intelligence signal, comprising a first coil member having a plurality of coaxial coil elements axially arranged in spaced apart relationship and each defining a phase winding, a second coil member concentrically disposed and magnetically coupled to said coil elements and movable relative thereto, a source of polyphase current having a frequency value equal to the frequency value of said electrical wave, means to apply a respective phase of said polyphase current to each of said coaxial coil elements, a loudspeaker having a movable voice coil mechanically coupled to said second coil member, means to apply said intelligence signal to said loudspeaker to produce relative motion between said first and second coil member in a direction parallel to the axis of said coil elements and in an amount proportional to intensity variations of said intelligence signal, and an output circuit coupled to said second coil member.

3. A transducer for an intelligence signal and an electrical wave having wavelength modulation proportional to variations in the intensity of said intelligence signal, comprising a first coil member having a pair of coaxial coil elements axially arranged in spaced apart relationship and each defining a phase winding, a solenoid concentrically disposed about said member and magnetically coupled to said coil elements and movable relative thereto, a source of two phase current having a frequency value equal to the frequency value of said electrical wave, means to apply a respective phase of said two phase current to each of said coaxial coil elements, means to produce relative motion between said solenoid and said member in a direction parallel to the axis of said coil elements and in an amount proportional to intensity variations of said intelligence signal, and an output circuit coupled to said coil member.

4. A transducer for an intelligence wave and an electrical wave having wavelength modulation proportional to variations in the intensity of said intelligence, comprising a first coil member having a plurality of coaxial coil elements axially arranged in spaced apart relationship and each defining a phase winding, a second coil member concentrically disposed about said first coil member and magnetically coupled to said coil elements and movable relative thereto, a source of polyphase current having a frequency value equal to the frequency value of said electrical wave, means to apply a respective phase of said polyphase current to each of said coaxial coil elements, motor means having a movable portion mechanically coupled to said second coil member and adapted to produce relative motion between said first and second coil members in a direction parallel to the axis of said coil elements and in an amount proportional to intensity variations of said intelligence wave, said movable portion of said motor means and said second coil member forming a mechanical system having a natural resonant frequency lower than the lowest resonant frequency of said intelligence wave, and an output circuit coupled to said second coil member.

E. G. BEARD.

REFERENCES CITED

The following references are of record in the file of this patent:

UNITED STATES PATENTS

| Number | Name | Date |
|---|---|---|
| 1,633,016 | Hartley | June 21, 1927 |
| 2,194,532 | Usselman | Mar. 26, 1940 |
| 2,353,162 | Kaltenbacher | July 11, 1944 |